United States Patent [19]

Hattori

[11] Patent Number: 5,655,992

[45] Date of Patent: Aug. 12, 1997

[54] CONTROL SYSTEM FOR MOTOR VEHICLE HAVING CONTINUOUSLY VARIABLE TRANSMISSION

[75] Inventor: Yuji Hattori, Susono, Japan

[73] Assignee: Toyota Jidosha Kabushiki Kaisha, Toyota, Japan

[21] Appl. No.: 564,648

[22] Filed: Nov. 29, 1995

[30] Foreign Application Priority Data

Dec. 5, 1994 [JP] Japan ................... 6-300829

[51] Int. Cl.⁶ ................ B60K 41/12; F02P 5/15; F16H 61/00
[52] U.S. Cl. ................ 477/107; 477/46; 477/48; 123/425
[58] Field of Search ................ 477/45, 46, 48, 477/97, 107; 123/425

[56] References Cited

U.S. PATENT DOCUMENTS

| | | | |
|---|---|---|---|
| 4,364,353 | 12/1982 | Fiala | 123/425 |
| 4,627,311 | 12/1986 | Yokooku et al. | 477/46 X |
| 4,735,114 | 4/1988 | Satoh et al. | 477/48 X |
| 4,843,916 | 7/1989 | Bouta | 477/97 |
| 5,215,059 | 6/1993 | Kaneyasu | 123/425 |

FOREIGN PATENT DOCUMENTS

| | | |
|---|---|---|
| 61-200034 | 9/1986 | Japan . |
| 2-180368 | 7/1990 | Japan . |

*Primary Examiner*—Khoi Q. Ta
*Attorney, Agent, or Firm*—Oblon, Spivak, McClelland, Maier & Neustadt, P.C.

[57] ABSTRACT

A control system (in FIG. 1A) for a motor vehicle having a continuously variable transmission, in which a control of better fuel consumption is selected between the retardation angle correction (the correction of the retardation angle side of an advance angle correction) of the ignition timing of an internal combustion engine and the increase correction of the target r.p.m. of a continuously variable transmission, and the selected control is executed, whereby the fuel consumption of the engine is relieved from worsening in a control for the prevention of knocking or for the suppression of NOx in emission.

2 Claims, 9 Drawing Sheets

GREATER ← ENGINE R. P. M. → SMALLER

CONTROL SYSTEM FOR MOTOR VEHICLE HAVING CONTINUOUSLY VARIABLE TRANSMISSION

BACKGROUND OF THE INVENTION

1. Field of the Invention

The present invention relates to a control system for a motor vehicle having a continuously variable transmission.

2. Description of the Prior Art

There have heretofore been known control techniques wherein, in order to suppress any of undesirable various phenomena ascribable to the combustion of fuel in an internal combustion engine, for example, the occurrence of knocking and the increase of Nox concentration, the ignition timing of the engine is retarded (an advance angle correction amount is corrected to the retardation angle side).

Japanese Patent Application Laid-open No. 180368/1990 discloses a technique wherein, in case of the occurrence of knocking in a motor vehicle having a continuously variable transmission (abbreviated to "CVT"), the knocking is suppressed by raising the target r.p.m. of an engine when the motor vehicle is in a constant speed drive state, and by heightening the gear shift speed of the CVT when the motor vehicle is in a rapid acceleration state. Japanese Patent Application Laid-open No. 200034/1986 discloses a technique wherein the knocking is extinguished in such a way that, upon the occurrence of knocking, a knock detection signal from a knock sensor is entered into a control unit, by which the change gear ratio of a CVT is decreased.

In the prior-art control for preventing the knocking from occurring or for preventing NOx production from increasing, as understood from the known examples stated above, only the retardation angle correction of the ignition timing, or only the gear shift speed or change gear ratio of the CVT installed in the motor vehicle has been paid attention. In other words, only one of the factors has been dealt with independently as the countermeasure of above problems.

The situation is grounded on the fact that the developments of automobiles in recent years cannot avoid being specialized due to the high technical levels thereof, so the control of the retardation angle as the countermeasure on the engine development side and the control of the gear shift speed or the change gear ratio as the countermeasure on the CVT development side are difficult to be merged with each other.

However, this fact conversely signifies that, even if a certain motor vehicle is assumed to have both a countermeasure based on the retardation angle control and a countermeasure based on the CVT control by way of example, in order to prevent the knocking and to prevent the NOx increase, the controls will be executed independently of each other.

The fuel consumption of the internal combustion engine, however, worsens depending upon the operating states thereof. More specifically, the fuel consumption worsens less when the retardation angle correction of the ignition timing is adopted in some cases, whereas it worsens less when the increase correction of the target r.p.m. of the CVT is adopted in the other cases. Accordingly, when the prior-art techniques are merely combined with the intention of suppressing the knocking or the NOx increase, the problem is apprehended that an appropriate control with the fuel consumption taken into consideration will not be executed, so the fuel consumption will worsen excessively.

SUMMARY OF THE INVENTION

The present invention has been made in order to solve the problem of the prior art, and has for its object to provide a control system for a motor vehicle having a continuously variable transmission, according to which worsening in a fuel consumption can be reduced to the utmost in the suppressions of the occurrence of knocking and the increase of Nox concentration.

The present invention has achieved the above object by adopting constructions as defined in claims 1 and 2, the main structures of which are shown in FIGS. 1A and 1B, respectively.

According to the present invention, in the specific operating state such as a state in which knocking occurs or a state in which the composition of emission is bad (for example, a state in which NOx have increased), the fuel consumption in the execution of the control of the retardation angle correction of the ignition timing of the internal combustion engine, and the fuel consumption in the execution of the control of the increase correction of the target r.p.m. of the continuously variable transmission ("CVT") are compared, and it is checked which control should be executed for a better fuel consumption. Subsequently, the control of the better fuel consumption is selected on the basis of the checked result, and the selected control is executed. Therefore, worsening in the fuel consumption can be reduced to the utmost in the prevention of the knocking, etc.

Moreover, if the following structure is adopted, worsening in the fuel consumption can be reduced still further by the more appropriate controls. That is the various combinational controls each of which contains the retardation angle correction magnitude in the retardation angle correction of the ignition timing and the increase correction magnitude in the increase correction of the target r.p.m. are compared, and it is checked which combinational control should be executed for the best fuel consumption. Subsequently, the retardation angle correction magnitude and the increase correction amount in the combinational control of the best fuel consumption are selected on the basis of the checked result, and the individual controls of the combinational control are respectively executed on the basis of the selected retardation angle correction magnitude and increase correction magnitude.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein.

DETAILED DESCRIPTION OF THE PREFERRED EMBODIMENTS

Now, the embodiments of the present invention will be described in detail with reference to the drawings.

Figure 1A:
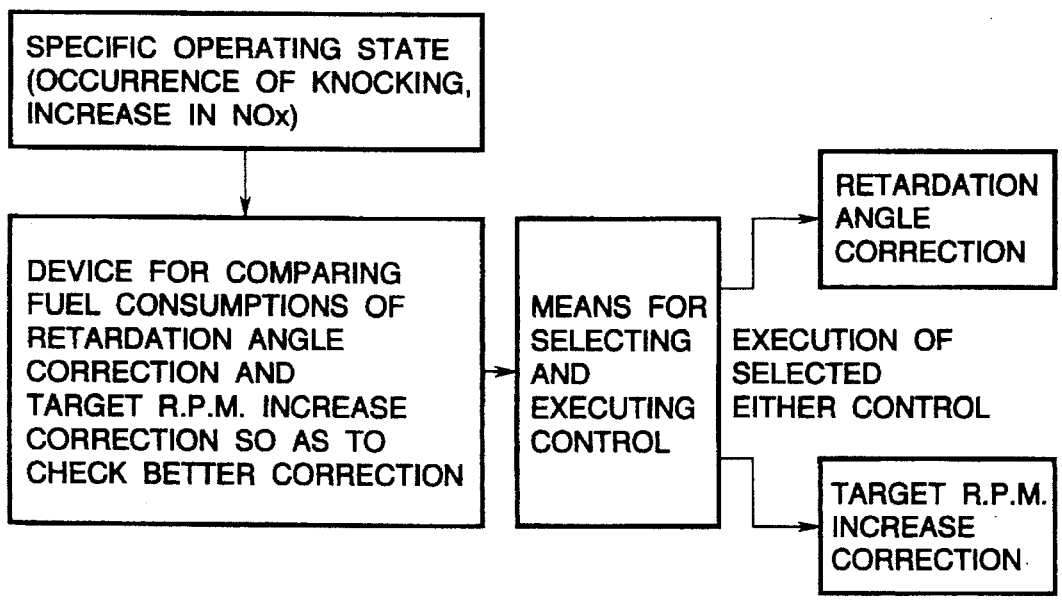
FIGS. 1A and 1B are block diagrams each showing the main gist of the present invention.
Figure 1B:
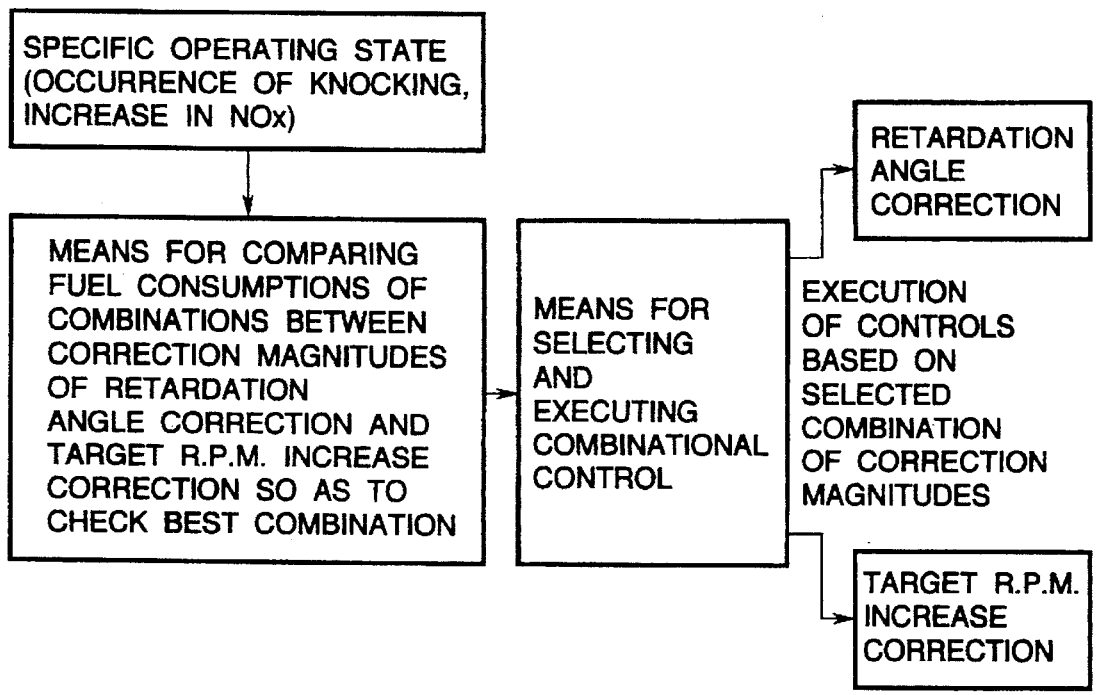
Figure 2:
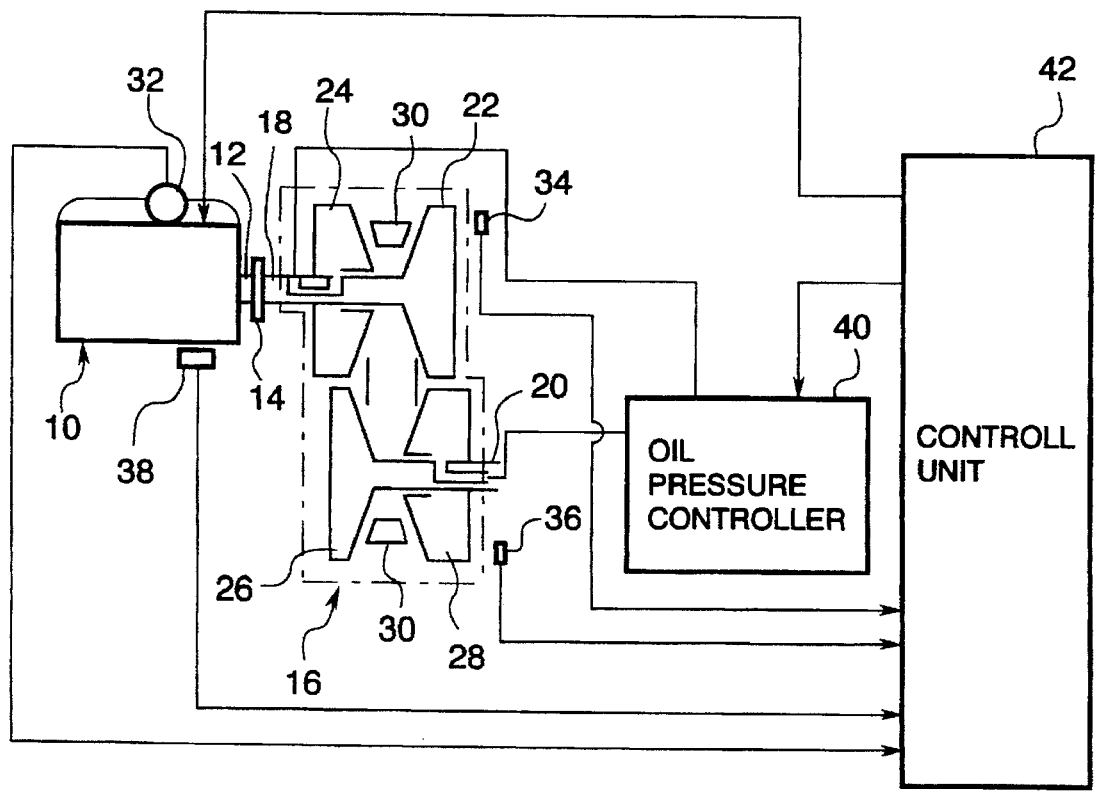
FIG. 2 is a schematic constructional view showing a control system for a motor vehicle having a continuously variable transmission, according to the present invention.

FIG. 2 is a schematic constructional view showing a control system for a motor vehicle having a continuously variable transmission, according to the present invention.

Referring to FIG. 2, numeral 10 indicates an internal combustion engine from which an output shaft 12 is extended. Shown at numeral 16 is the continuously variable transmission (hereinafter, abbreviated to "CVT"). An input shaft 18, which is connected with the output shaft 12 through a clutch 14, is extended into the CVT 16, while an output shaft 20 is extended from the CVT 16. This CVT 16 includes an input side stationary disc 22, an input side movable disc 24, an output side stationary disc 26 and an output side movable disc 28. A belt 30 is stretched over the input side and output side discs of the CVT 16.

In addition, a throttle opening degree sensor 32 detects the opening degree θ of the intake system throttle valve of the engine 10. An input side rotational angle sensor 34 and an output side rotational angle sensor 36 detect the rotational angles (in other words, rotational frequencies or r.p.m.) of the input side stationary disc 22 and the output side movable disc 28, respectively. A knock sensor 38 detects the occurrence of knocking.

Besides, an oil pressure controller 40 controls the movable discs of the CVT 16. A control unit 42 receives the outputs of the throttle opening degree sensor 32, rotational angle sensors 34, 36 and knock sensor 38, and it controls the ignition timing of the internal combustion engine 10 directly and the r.p.m. of the CVT 16 through the hydraulic controller 40.

Here, the concrete structure will be explained in detail. The output shaft 12 of the internal combustion engine 10 is connected to the input shaft 18 of the CVT 16 through the clutch 14. The input shaft 18 and the output shaft 20 are disposed in parallel with each other. The input side stationary disc 22 is fixed to the input shaft 18, while the input side movable disc 24 is mounted on the outer periphery of the input shaft 18 through a spline, a ball bearing or the like so as to be movable in the axial direction of this shaft 18. Likewise, the output side stationary disc 26 is fixed to the output shaft 20, while the output side movable disc 28 is mounted on the outer periphery of the output shaft 20 through a spline, a ball bearing or the like so as to be movable in the axial direction of this shaft 20. By the way, the pressure receiving areas of the movable discs are set larger on the input side than on the output side. The axial arrangements of the stationary discs and movable discs are set inverse to each other between on the input side and on the output side.

The opposing surfaces of the stationary disc 22 (or 26) and movable disc 24 (or 28) are formed as tapered surfaces the mutual distance of which increases radially outwards. The belt 30 is extended across the input side and output side discs. Accordingly, as forces pressing the stationary and movable discs change, the radial contact positions of the belt 30 on the disc surfaces change continuously.

When the contact position of the belt 30 on the surfaces of the input side discs 22 and 24 moves radially outwards, the contact position of the belt 30 on the surfaces of the output side discs moves radially inwards, with the result that the speed ratio of the CVT 16 increases. In the converse case, the speed ratio decreases. The power of the output shaft 20 is transmitted to driving wheels not shown.

An oil pressure is controlled by the hydraulic controller 40 so that the pressing force which ensures the torque transmission without the slide of the belt 30 may be developed on the output side discs 26 and 28. Namely, the speed ratio is controlled by positively changing the pressing force of the input side discs 22 and 24.

Incidentally, the embodiments to be described below include, not only a case where the knock sensor 38 is mounted, but also a case where it is not mounted.

The first embodiment will be explained with reference to FIG. 3.

The first embodiment corresponds to the case where the knock sensor 38 is mounted. More specifically, this embodiment concerns the combination of an internal combustion engine and a CVT having a system for detecting the knocking of the engine. In this embodiment, when the knocking has been detected, a control mode which affords a better fuel consumption rate (that is, with which a fuel consumption worsens less) is selected between the following control modes (1) and (2):

(1) Knock suppression control mode based on the retardation angle correction (the correction in which an advance angle magnitude is made smaller) of the ignition timing of the internal combustion engine;

(2) Knock suppression control mode based on the increase correction of the target r.p.m. of the CVT. Thereafter the selected control mode (1) or (2) is executed.

Figure 3:
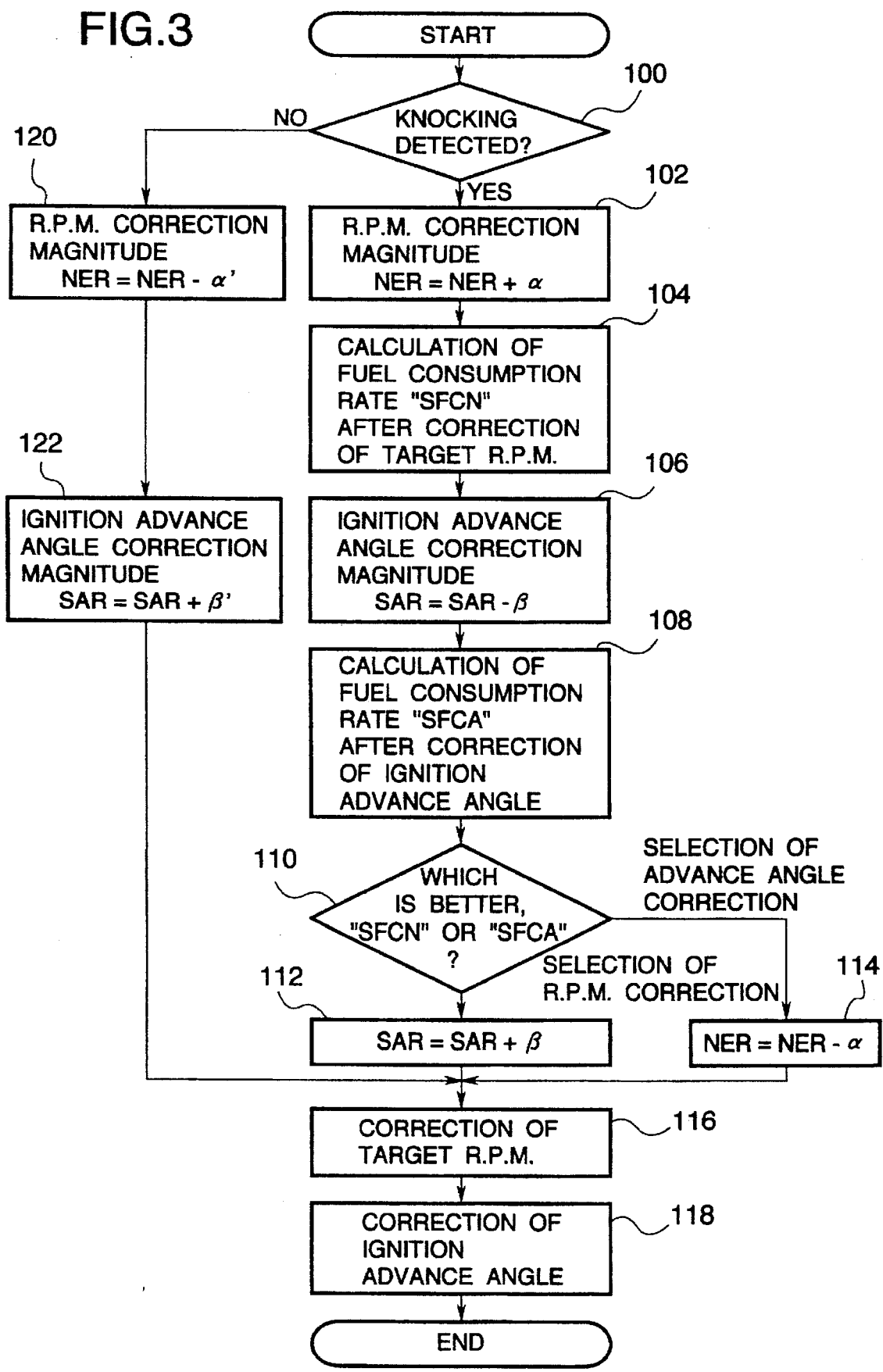
FIG. 3 is a flow chart showing the control of the first embodiment of the present invention.

At a step 100 in the control flow of FIG. 3, whether the knocking of the engine 10 has been detected by the knock sensor 38 or not is checked by a known method. In a case where the engine 10 is not in a knocking state, the control flow proceeds to a step 120. On the other hand, in the case where the knocking has been detected, the control flow proceeds to a step 102, at which a target r.p.m. correction magnitude NER (which is evaluated in accordance with other factors) is further corrected to NER+α. The NER+α is a mere numerical value and the actual target r.p.m. correction is not executed yet.

Subsequently, at a step 104, a fuel consumption rate SFCN after the target r.p.m. correction is calculated. At a step 106, an ignition advance angle correction magnitude SAR (which is evaluated in accordance with other factors) is further corrected to SAR−β. The SAR−β is a mere numerical value, and the actual correction is not executed yet. At a step 108, a fuel consumption rate SFCA after the ignition advance angle correction is calculated.

Figure 4:
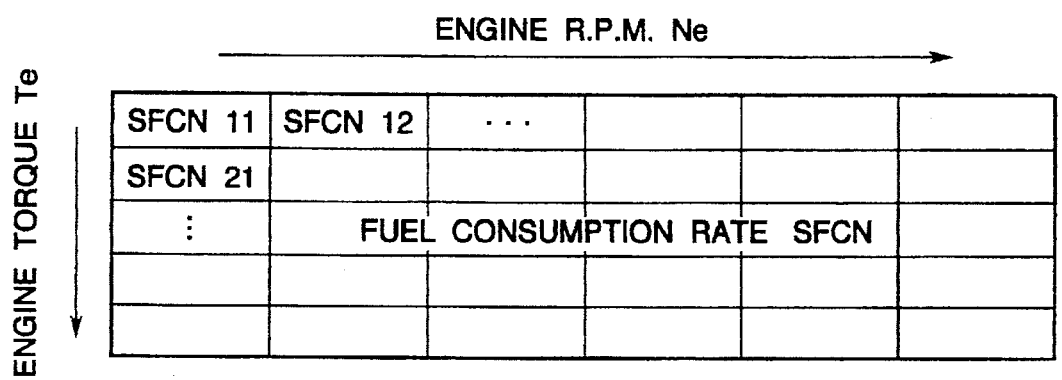
FIG. 4 is a graph showing a map for finding a fuel consumption rate after the correction of target r.p.m. (revolutions per minute)
Figure 5:
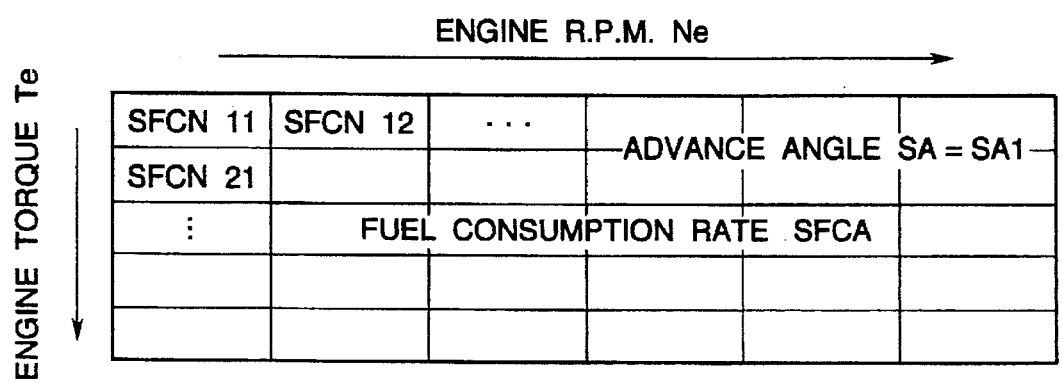
FIG. 5 is a graph showing a map for finding a fuel consumption rate after the correction of an advance angle.

Here, the fuel consumption rate SFCN after the target r.p.m. correction is obtained from a two-dimensional map of engine r.p.m. Ne (corresponding to the target r.p.m.)— engine torque Te as shown in FIG. 4 by way of example. Besides, the fuel consumption rate SFCA after the ignition advance angle correction is obtained from a three-dimensional map of engine r.p.m. Ne—engine torque Te—ignition advance angle SA as shown in FIG. 5 by way of example.

At a step 110, the magnitudes of the fuel consumption rates SFCN and SFCA evaluated at the respective steps 104 and 108 are compared, and either the r.p.m. correction or the advance angle correction is selected in accordance with the better one of the fuel consumption rates. In a case where the magnitude of the fuel consumption rate SFCN is smaller (that is, the fuel consumption of the engine 10 is better) and where the target r.p.m. correction is selected, the ignition advance angle correction magnitude SAR is restored at a step 112. In contrast, in a case where the magnitude of the fuel consumption rate SFCA is smaller to offer the better fuel consumption and where the ignition advance angle correction is selected, the r.p.m. correction magnitude NER is restored at a step 114.

Thereafter, the controls based on the target r.p.m. correction and the ignition advance angle correction are respectively executed at steps 116 and 118. In substance, however, only the selected correction control is executed because the correction magnitude of the unselected correction control has been restored as stated above.

Meanwhile, in the case where the engine 10 is not in the knocking state (at the step 100), the target r.p.m. correction magnitude and the ignition advance angle correction magnitude are respectively corrected some magnitudes ($\alpha'$ and $\beta'$) in directions in which the knocking is more liable to occur, at steps 120 and 122. Thereafter, the control flow proceeds to the steps 116 and 118. Accordingly, when the control flow is run, the engine 10 is kept in a state (so-called "trace knock" state) immediately before the occurrence of the knocking, and the fuel consumption and the output power thereof are both held supremely.

Incidentally, the target r.p.m. correction magnitude NER and the ignition advance angle correction magnitude SAR are endowed with upper-limit and lower-limit guards, depending upon the drive conditions of the motor vehicle.

Now, the second embodiment of the present invention will be described.

The second embodiment exemplifies the case where no knock sensor is mounted, and the controls (1) and (2) itemized before are simultaneously executed in the combination of the best fuel consumption rate. The control flow of the second embodiment will be explained with reference to a flow chart of FIG. 6 below.

At a step 200, the state of the engine 10 is presumed. The state of the engine 10 is presumed from, for example, the working region of the engine or the temperature (with or without the humidity) of the intake air of the engine. The working region of the engine can be conjectured on the basis of the opening degree of the throttle valve and the r.p.m. of the engine; the intake air temperature on the basis of the speed of the motor vehicle, the temperature of engine water and the ON-OFF signal of a motor fan; and the humidity on the basis of the operation of a wiper. Thus, the state in which the knocking is more liable to occur can be detected without especially employing any dedicated sensor.

Subsequently, at a step 202, whether or not the knocking is likely to occur is checked from the presumed engine state. In the case where the knocking is not likely to occur, the processing of the control is directly ended. On the other hand, in the case where the knocking is likely to occur, the control flow proceeds to a step 204, at which the r.p.m. correction magnitude NER is increased by $\alpha$ as in the first embodiment.

Thereafter, at a step 206, the ignition advance angle correction magnitude SAR at the r.p.m. after the r.p.m. correction (at the increased r.p.m.) is calculated on the basis of the engine state presumed at the step 200. The magnitude SAR is calculated using, for example, a three-dimensional map of engine r.p.m. Ne—throttle opening degree $\theta$—intake air temperature Tair, which is similar to the three-dimensional map shown in FIG. 5. Alternatively, the worsening of the fuel consumption rate may well be evaluated as a function of the advance angle and the r.p.m.

At the next step 208, the fuel consumption rate SFCA is obtained from the r.p.m. and the ignition advance angle which have been set at the steps up to the step 206. The obtained fuel consumption rate is stored in a memory device (RAM).

Subsequently, whether or not the ignition advance angle correction magnitude SAR is 0 (zero) is checked at a step 210. Unless the correction magnitude SAR is 0, the control flow returns to the step 204, and steps 204 to 208 are repeated until the correction magnitude SAR becomes 0. That is, each time the r.p.m. correction magnitude NER is increased by $\alpha$, the ignition advance angle correction magnitude SAR corresponding to the new correction magnitude NER and the fuel consumption rate SFCA under the condition of the new correction magnitude SAR are calculated. Such processing is iterated until the ignition advance angle correction magnitude SAR becomes 0 at the step 210.

When the ignition advance angle correction magnitude SAR has become 0, the control flow proceeds to a step 212. At the step 212, the fuel consumption rates in the individual combinations as obtained at the step(s) 208 are compared so as to select that combination of the r.p.m. correction magnitude NER and the advance angle correction magnitude SAR which minimizes the fuel consumption rate SFCA. At the next steps 214 and 216, the controls of the target r.p.m. correction and the ignition advance angle correction are respectively carried out.

Now, the third embodiment of the present invention will be explained.

Also the third embodiment corresponds to the case where no knock sensor is mounted. In the third embodiment, the drive condition under which the knocking is likely to occur is estimated, and, when the knocking state is conjectured, the control mode of better fuel consumption rate is selected from said itemized control modes (1) and (2), and is executed.

Figure 6:
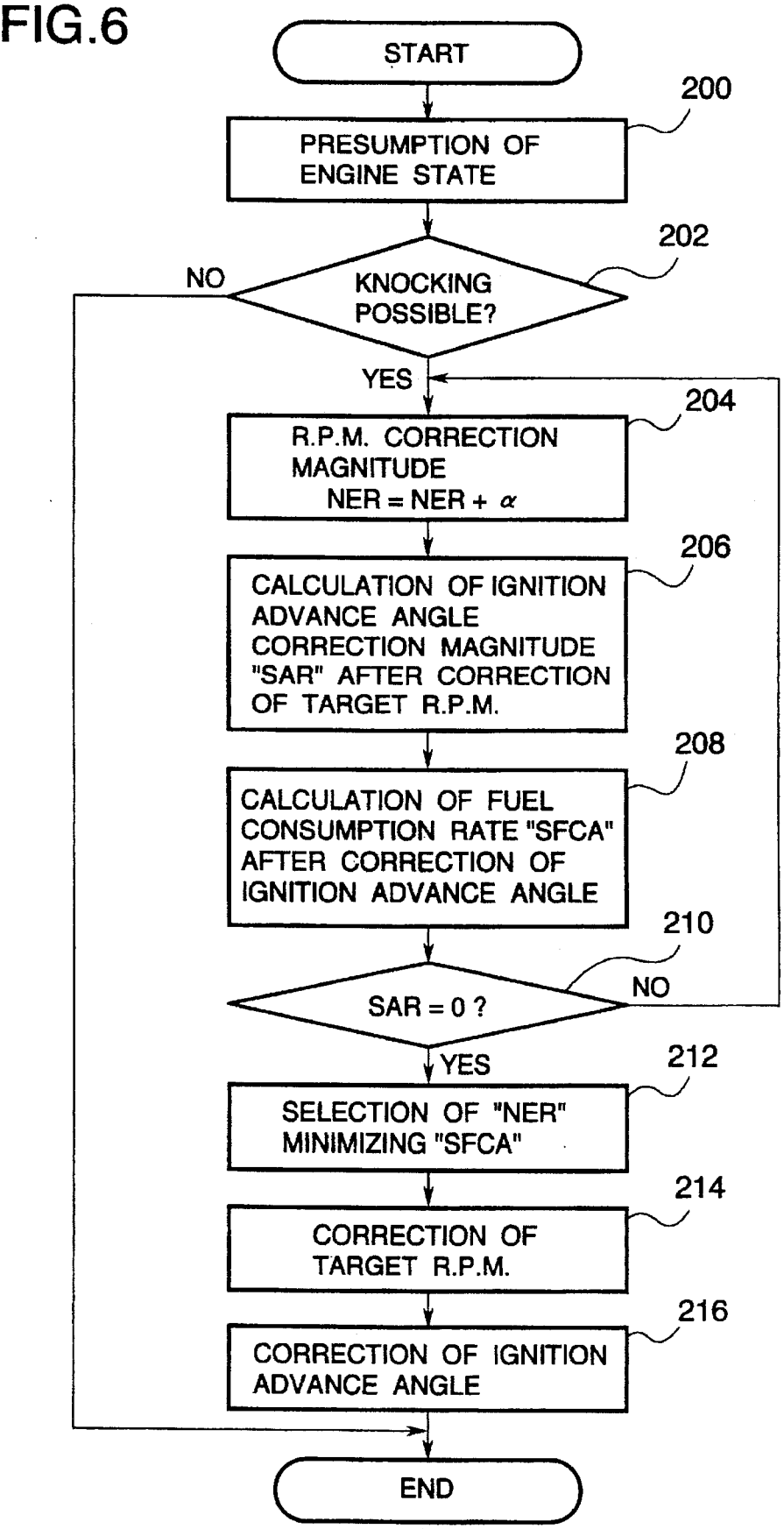
FIG. 6 is a flow chart showing the control of the second embodiment of the present invention.
Figure 7:
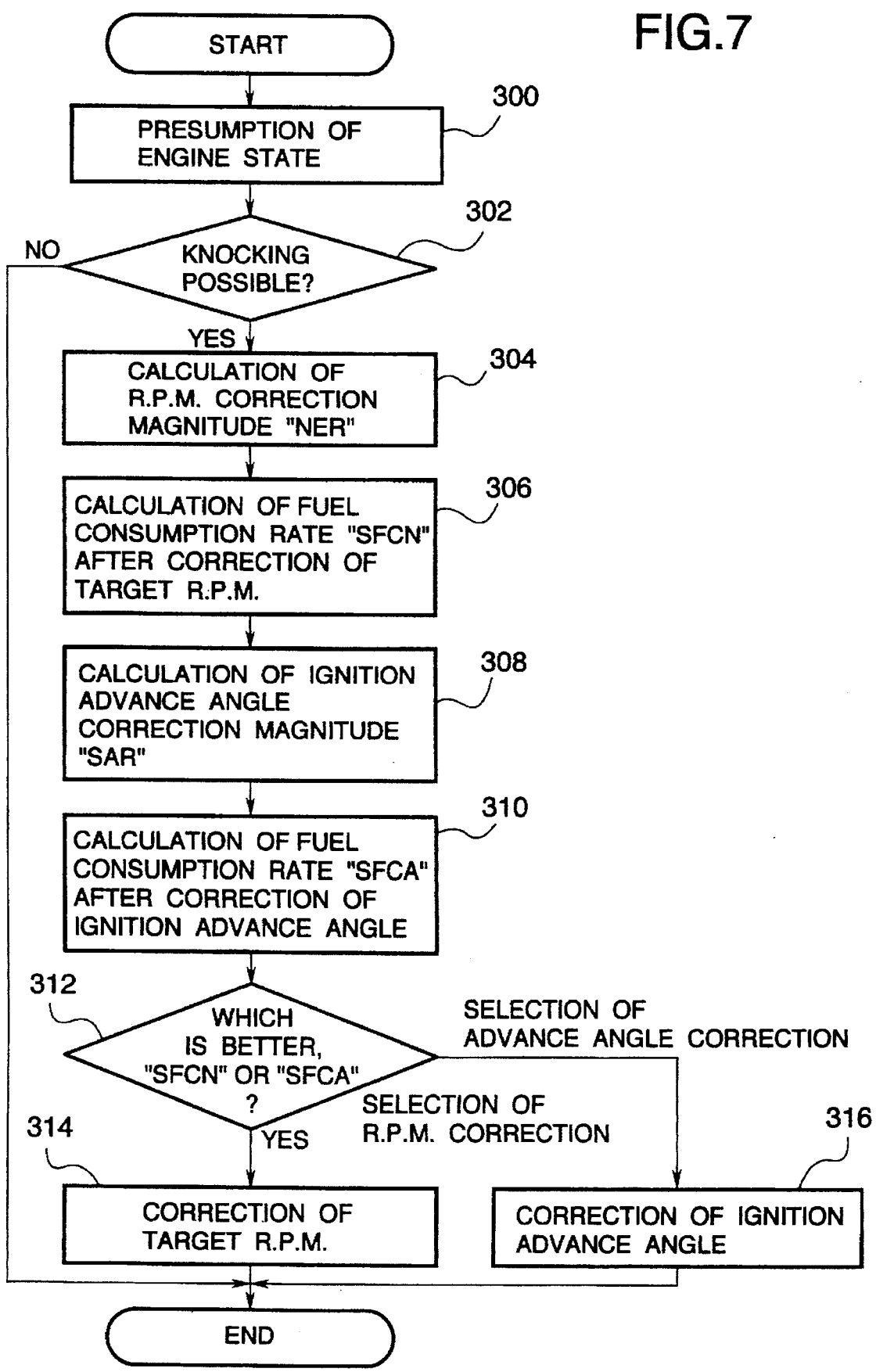
FIG. 7 is a flow chart showing the control of the third embodiment of the present invention.

FIG. 7 illustrates the control flow of the third embodiment. At a step 300 in FIG. 7, the state of the engine 10 is presumed from the current drive situation of the motor vehicle. The presumption is done similarly to that of the second embodiment at the step 200 shown in FIG. 6.

Subsequently, at a step 302, whether the knocking is likely to occur or not is checked on the basis of the engine state presumed at the step 300. Here, if the state in which the knocking is likely to occur is detected, the control flow is ended without any processing.

On the other hand, if the state in which the knocking is likely to occur is detected, the control flow proceeds to a step 304, at which the target r.p.m. correction magnitude NER is calculated. Further, the fuel consumption rate SFCN after the target r.p.m. correction is calculated at the next step 306.

Figure 8:
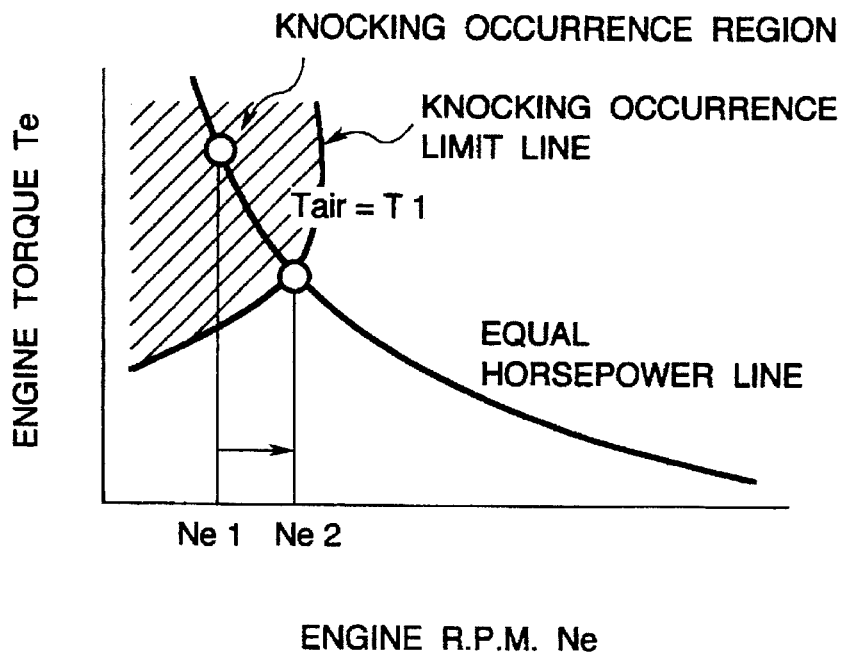
FIG. 8 is a graph showing the aspect of correcting engine r.p.m. along an equal horsepower line.
Figure 9:
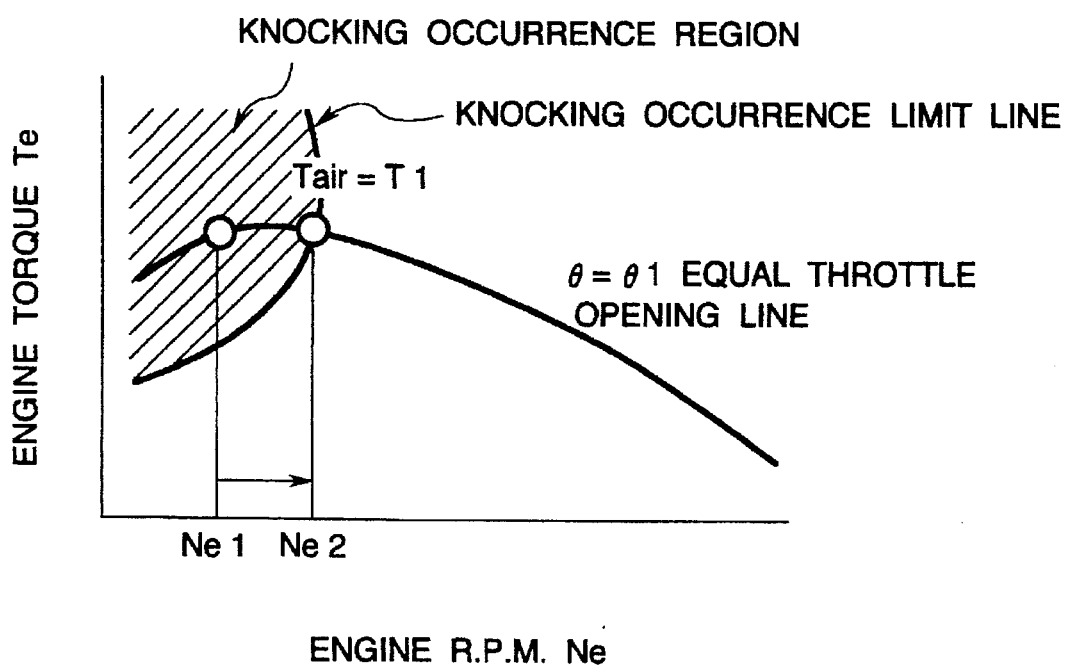
FIG. 9 is a graph showing the aspect of correcting engine r.p.m. along an equal throttle opening line.

Two methods as shown in FIGS. 8 and 9 are considered by way of example for the calculation of the correction magnitude NER. Basically, both methods corrects the target r.p.m. (engine r.p.m.) from a value Ne1 to a value Ne2 without giving rise to knocking. The method shown in FIG.

8 corrects the r.p.m. to a knocking limit while tracing an equal horsepower line, whereas the method shown in FIG. 9 corrects the r.p.m. to a knocking limit while tracing an equal throttle opening line.

In the case of the method of FIG. 8, the knocking limit (engine) r.p.m. NER and the fuel consumption rate SFCN are calculated using a two-dimensional map of intake air temperature Tair (taken on the abscissa)—driving force He (taken on the ordinate), which indicates the engine r.p.m. NER or the fuel consumption rate SFCN for the various values of the temperature Tair and force He in the same manner as in FIG. 4.

Besides, in the case of the method of FIG. 9, the knocking limit (engine) r.p.m. NER and the fuel consumption rate SFCN are calculated using a two-dimensional map of intake air temperature Tair (taken on the abscissa)—throttle opening degree $\Theta$ (taken on the ordinate), which is similar to the above.

Subsequently, the ignition advance angle correction magnitude SAR is calculated at a step 308, and the fuel consumption rate SFCA after the ignition advance angle correction is calculated at a step 310. Here, the knocking limit ignition advance angle SAR and the fuel consumption rate SFCA are calculated using a three-dimensional map of engine r.p.m. Ne (taken on the abscissa)—throttle opening degree $\Theta$ (taken on the ordinate)—intake air temperature Tair, which indicates the advance angle SAR or the fuel consumption rate SFCA for the various values of the temperature Tair in the same manner as in FIG. 5.

Subsequently, at a step 312, the fuel consumption rate SFCN after the target r.p.m. correction and the fuel consumption rate SFCA after the ignition advance angle correction obtained at the respective steps 306 and 310 are compared, and the control of the better fuel consumption rate is selected between the controls of the target r.p.m. correction and the ignition advance angle correction.

In a case where the fuel consumption rate SFCN is smaller, the target r.p.m. correction is selected, and it is executed at a step 314. On the other hand, in a case where the fuel consumption rate SFCA is smaller, the ignition advance angle correction is selected, and it is executed at a step 316.

Now, the fourth embodiment of the present invention will be explained.

The fourth embodiment concerns the combination of an engine and a CVT having no NOx (nitrogen oxides) sensor. When the NOx content of emission is detected to exceed a preset value, a control mode which affords a better fuel consumption rate is selected between the following two control modes (3) and (4):

(3) NOx suppression control mode based on the retardation angle correction of the engine;

(4) NOx suppression control mode based On the target r.p.m. correction of the CVT;

Thereafter the selected control mode (3) or (4) is executed.

Figure 10:
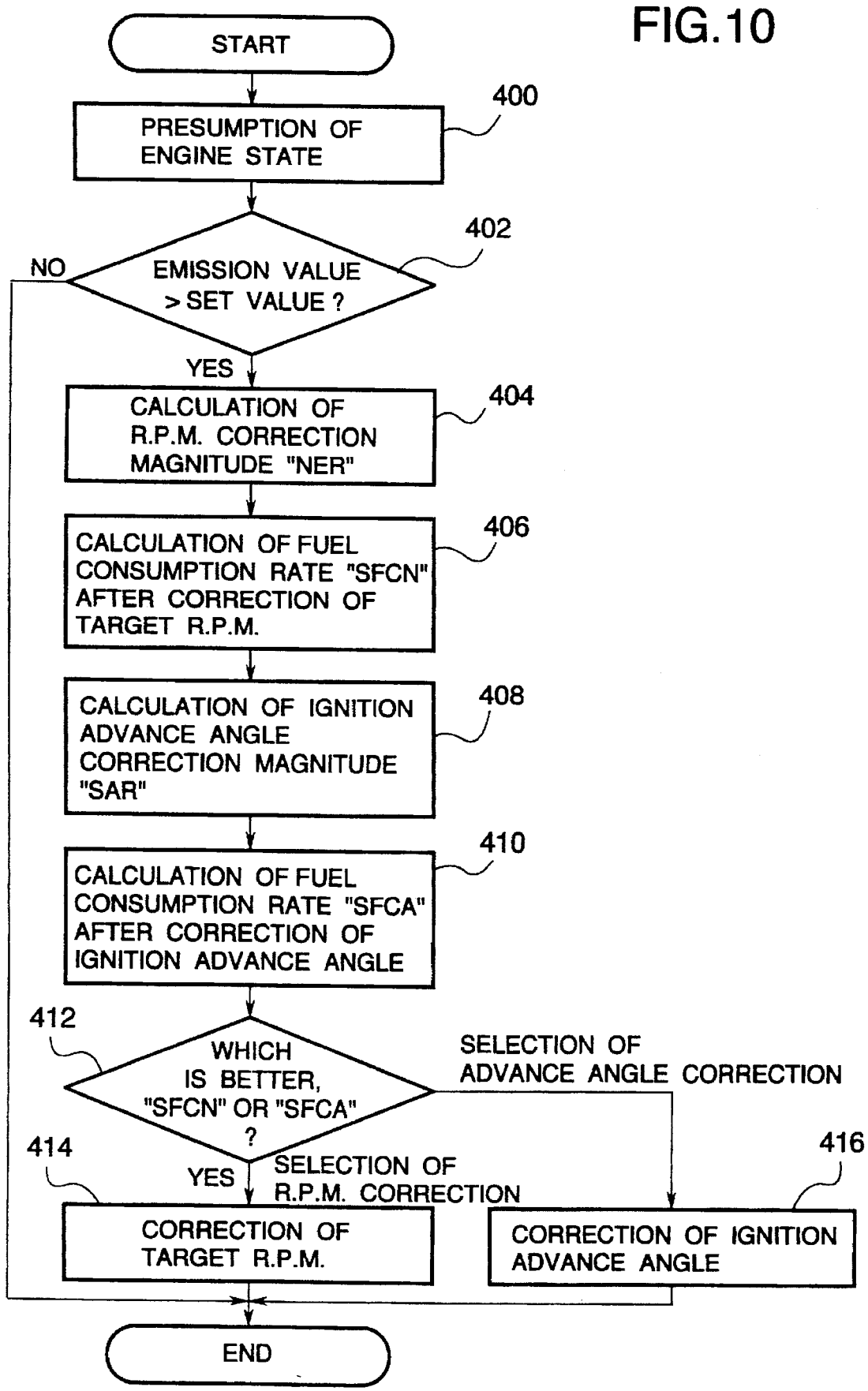
FIG. 10 is a flow chart showing the control of the fourth embodiment of the present invention.

The control flow of the fourth embodiment is illustrated in a flow chart of FIG. 10.

At a step 400 in FIG. 10, the state of the engine 10 is presumed from the current drive situation of the motor vehicle. By way of example, this step is executed using the working region of the engine, or the like, similarly to the step 200 of the second embodiment as shown in FIG. 6.

Subsequently, at a step 402, whether or not the emission value (the NOx content) can exceed the preset value is decided on the basis of the engine state presumed at the step 400. Here, if the emission value is presumed to be not larger than the preset value, the control flow is ended without any processing.

On the other hand, if the emission value is presumed to be larger than the preset value, the control flow proceeds to a step 404. Thenceforth, processing similar to that of the steps 304 et seq. of the third embodiment as shown in FIG. 7 is executed.

That is, the fuel consumption rates after the target r.p.m. correction and after the ignition advance angle correction are calculated, they are compared to select the control of the better fuel consumption rate, and the selected control is executed.

Figure 11:
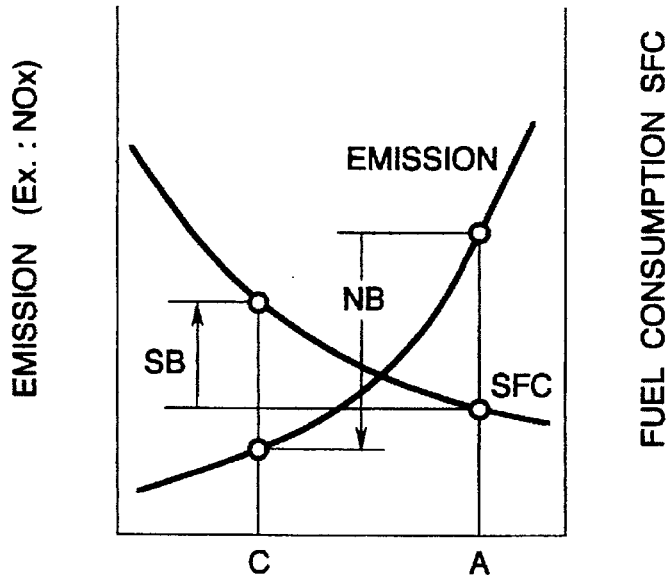
FIG. 11 is a graph showing the aspect of suppressing an emission component in accordance with an engine r. p.m. correction.
Figure 12:
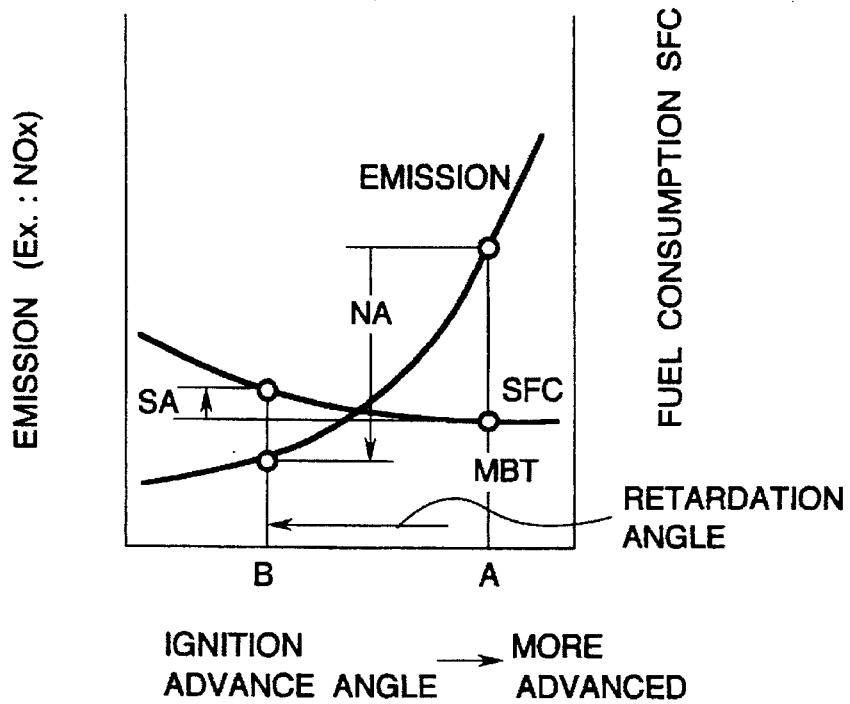
FIG. 12 is a graph showing the aspect of suppressing an emission component in accordance with an advance angle correction.

Herein, it is assumed by way of example that, when the engine r.p.m. Ne are corrected to rise from a value A to a value C at an equal horsepower with the advance angle held at the optimum ignition timing (MBT short for the most best torque), as shown in FIG. 11, the emission value (NOx content) is suppressed by an amount NB, the fuel consumption worsening by an amount SB instead. On the other hand, it is also assumed by way of example that, when the ignition advance angle is corrected to retard from a value A to a value B with the engine r. p.m. Ne held constant, as shown in FIG. 12, the emission value is suppressed by an amount NA (=NB), the fuel consumption worsening by an amount SA instead. Under the assumptions, the worsening amounts SA, SB of the fuel consumptions in the case where the equal emission amounts (NA=NB) is suppressed have a relation of SA<SB. That is, the retardation angle correction affords the better fuel consumption rate. On this occasion, therefore, the control based on the retardation angle correction is selected.

Incidentally, in the fourth embodiment, the detection as to whether or not the emission value exceeds the preset value may well be rendered directly by mounting a NOx sensor, not through the presumption of the engine state. Although one of the two controls (1) and (2), or (3) and (4) which affords the better fuel consumption is selected and executed in the third embodiment and the fourth embodiment, the two corresponding controls in each of these embodiments may well be executed in combination as in the second embodiment.

In each of the foregoing embodiments, the worsening of the fuel consumption can be reduced to the utmost by selecting the control which affords the better fuel consumption, or the combinational control of the retardation angle correction and the r.p.m. correction which affords the best fuel consumption. More specifically, in the combination of an engine and a CVT not having a system for detecting the knocking of the engine, it has heretofore been common practice that the knocking is prevented from occurring even in an extreme situation which is not frequent, for example, in the drive of the motor vehicle in a traffic jam in midsummer. This aspect worsens the fuel consumption rate under the condition under which no knocking occurs during the ordinary drive of the motor vehicle. In contrast, according to each of the embodiments, the knocking is avoided by presuming or detecting the knocking condition, whereby the actual knock occurrence in the infrequent extreme condition can be surely avoided. Therefore, the ignition advance angle etc. can be optimized in accordance with the ordinary drive condition. Furthermore, even the condition in which the knocking occurs is coped with by the method which reduces the worsening of the fuel consumption most. Therefore, the fuel consumption can be enhanced still more.

In the case where the system for detecting the knock is included, a more delicate control can carried out in accordance with the signal of the knock sensor, and the fuel consumption can be enhanced still more.

As described above, according to the present invention, a fuel consumption can be relieved from worsening in a control for preventing knocking or for suppressing the NOx content of emission. Moreover, a fuel consumption during an ordinary drive in which no knocking occurs can be enhanced.

What is claimed is:

1. A control system for a motor vehicle having a continuously variable transmission, wherein at least one of controls of a retardation angle correction of an ignition timing of an internal combustion engine and an increase correction of target r.p.m. of the continuously variable transmission is executed in a specified operating state of the engine; comprising:

means for comparing a fuel consumption in the execution of the control of the retardation angle correction of the ignition timing and a fuel consumption in the execution of the control of the increase correction of the target r.p.m.;

means for checking either of said controls is to be executed for a better fuel consumption; and means for selecting the control of the better fuel consumption on the basis of the checked result;

means for executing the selected control.

2. A control system for a motor vehicle having a continuously variable transmission, wherein at least one of controls of a retardation angle correction of an ignition timing of an internal combustion engine and an increase correction of target r.p.m. of the continuously variable transmission is executed in a specified operating state of the engine; comprising:

means for comparing combinational controls based on a plurality of combinations each of which contains a retardation angle correction magnitude in the retardation angle correction of the ignition timing and an increase correction magnitude in the increase correction of the target r.p.m.;

means for checking any one of the combinational controls is to be executed for the best fuel consumption; and means for selecting the retardation angle correction magnitude and the increase correction magnitude in the combinational control of said best fuel consumption, on the basis of the checked result; and means for executing the individual controls of said combinational control on the basis of the selected retardation angle correction magnitude and increase correction magnitude.

* * * * *